United States Patent
Hsiao et al.

(10) Patent No.: US 7,178,951 B1
(45) Date of Patent: Feb. 20, 2007

(54) DIRECT BACKLIGHT MODULE

(75) Inventors: Meng-Jia Hsiao, Fengyuan (TW); Shen-Hong Chou, Toufen Town (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/278,619

(22) Filed: Apr. 4, 2006

(30) Foreign Application Priority Data

Dec. 8, 2005 (TW) .............................. 94143406 A

(51) Int. Cl.
*F21V 15/01* (2006.01)
(52) U.S. Cl. ....................................... 362/362; 362/632
(58) Field of Classification Search ................ 362/31, 362/632, 633, 634, 219, 362, 249
See application file for complete search history.

(56) References Cited

U.S. PATENT DOCUMENTS

| | | |
|---|---|---|
| 5,816,680 A | 10/1998 | Sato |
| 6,412,968 B1 | 7/2002 | Ohkawa |
| 6,761,461 B2 | 7/2004 | Mizutani et al. |
| 7,092,048 B2 * | 8/2006 | Jeong .......................... 349/58 |

\* cited by examiner

*Primary Examiner*—Laura K. Tso
(74) *Attorney, Agent, or Firm*—Grossman, Tucker, Perreault & Pfleger, PLLC

(57) ABSTRACT

A plurality of reflecting structures are provided at the corner portions of a backlight module, so that the dark areas occurring at the corner portions or edges of the backlight module are prevented from forming, thereby uniforming the luminance performed by the display.

20 Claims, 6 Drawing Sheets

DIRECT BACKLIGHT MODULE

CROSS-REFERENCES TO RELATED APPLICATIONS

This application claims priority to Taiwan Patent Application No. 094143406 filed on Dec. 8, 2005.

BACKGROUND OF THE INVENTION

1. Field of the Invention

The present invention relates to a direct backlight module, especially to a light emitting diode backlight module and a liquid crystal display (LCD) using the same, whereby the undesired dark areas on the corners and/or edges of the display can be efficiently reduced, resulting in a uniform overall luminance.

2. Descriptions of the Related Art

Liquid crystal displays (LCDs) have become the most popular displays because of the light weight and good displaying quality. The backlight module is an important illumination structure of the LCD. Controlling the transmissive light provided from the backlight module in association with the liquid crystal cells in a matrix of a panel, and appropriately controlling switches, make the brightness and quality of the images presented on the display be determined. Light emitting diodes (LEDs) widely serve as the light source of the backlight module because of the low power consumption, light weight and high luminance. Therefore, LEDs have gradually become substitutes for fluorescent lamps when selecting light sources for the backlight module.

FIG. 1 is a perspective view of a conventional LCD, which comprises an LCD panel 30, a front frame 20 disposed on the LCD panel 30, a backlight module 10 having an LED array 103 disposed on a back bezel 101, and a frame assembly 102 disposed along the edges of the back bezel 101. The backlight module 10 is a direct type backlight module. There are a plurality of optical films 40 disposed between the LCD panel 30 and the backlight module 10 for enhancing the efficiency of light usage and luminance promotion. The optical films 40 can be diffusing films, prism films, acrylic films and/or light enhancing films.

Generally, the LCD panel 30 comprises an upper glass substrate, a lower glass substrate, and a liquid crystal layer (not shown) disposed therebetween. The upper glass substrate and the lower glass substrate can be a color filter substrate and an active (or passive) array substrate, respectively. The voltage difference between the upper and the lower glass substrates makes the liquid crystal in the liquid crystal layer rotate or tilt accordingly. Therefore, the light transmitting through the LCD panel 30 will be controlled and will then produce images on the LCD panel 30.

The LED array 103 can be constituted by individually packaging a plurality of single LEDs or by integrally packaging a module that has a plurality of LEDs. A printed circuit board (not shown) is electrically connected to the LED array 103 for supplying power. The LEDs of the LED array 103 can be red, green, blue, or white LEDs, depending on the requirements of the LCD panel 30.

The material of the frame assembly 102 and the back bezel 101 can be light reflective. The internal walls thereof can also be made of reflective materials or have reflective films stuck to the walls to reflect the light projected from the LED array 103.

Nevertheless, there is no light source disposed on the corner or edge portions of the backlight module because the undesired dark areas may occur in those parts, thereby causing the brightness of the overall backlight module to not be uniform. Additional light sources that are disposed on the corner or edge portions of the backlight module make the design and manufacturing procedures more complicated. Thus, it is not facilitated to control the uniformity of the brightness by adding light sources at the edges and corners.

SUMMARY OF THE INVENTION

The primary objective of this invention is to provide a direct backlight module that has LEDs. By disposing a reflector on the corner portions of the backlight module, the undesired dark areas on the corner portions or the edges of the backlight module can be reduced.

Another objective of this invention is to provide an LCD comprising a direct backlight module that has LEDs. By disposing a reflector on the corner portions of the backlight module, the brightness of the backlight module can be more uniform, resulting in the enhancement of the overall quality of the LCD.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
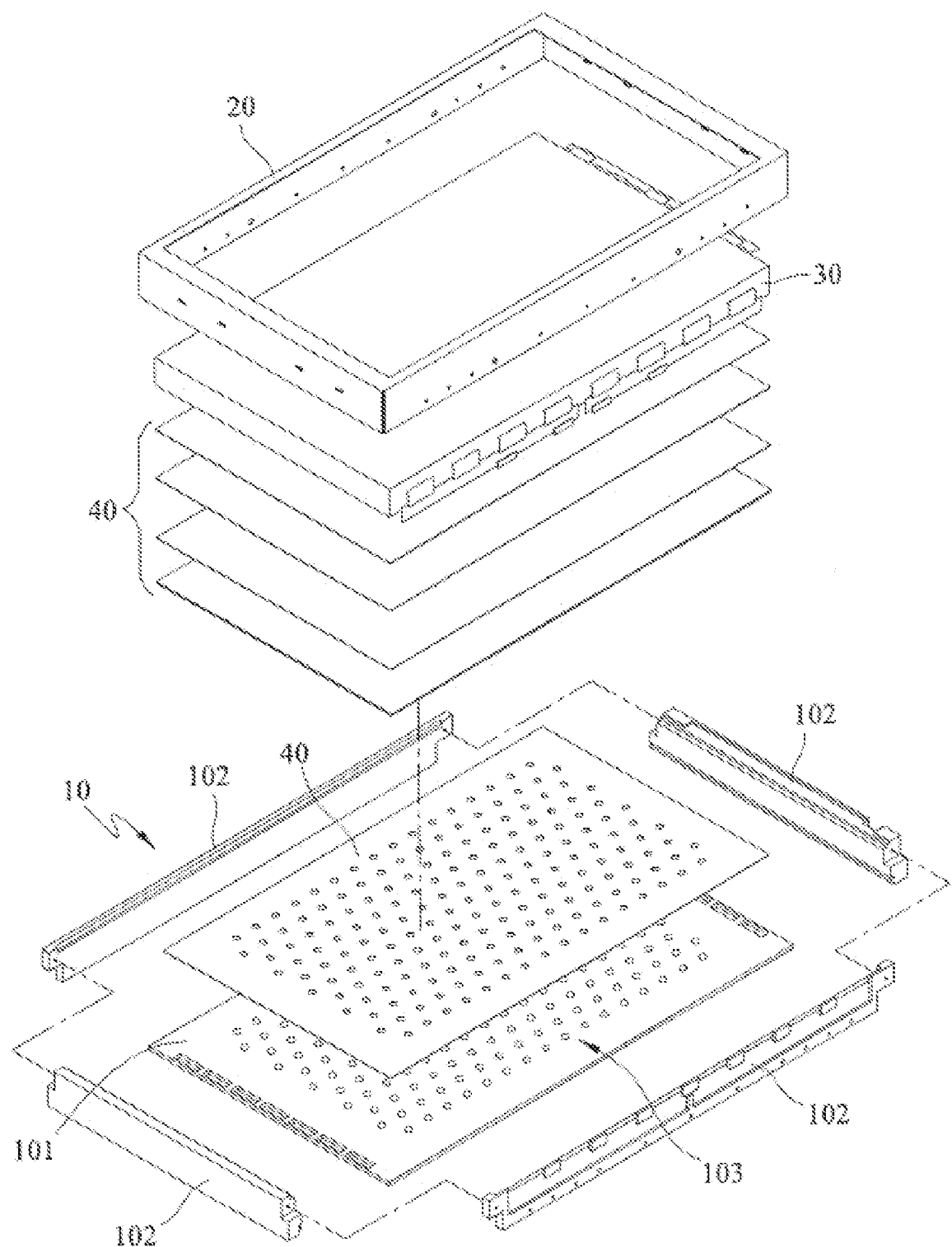
FIG. 1 is a perspective view showing a conventional LCD.
Figure 2:
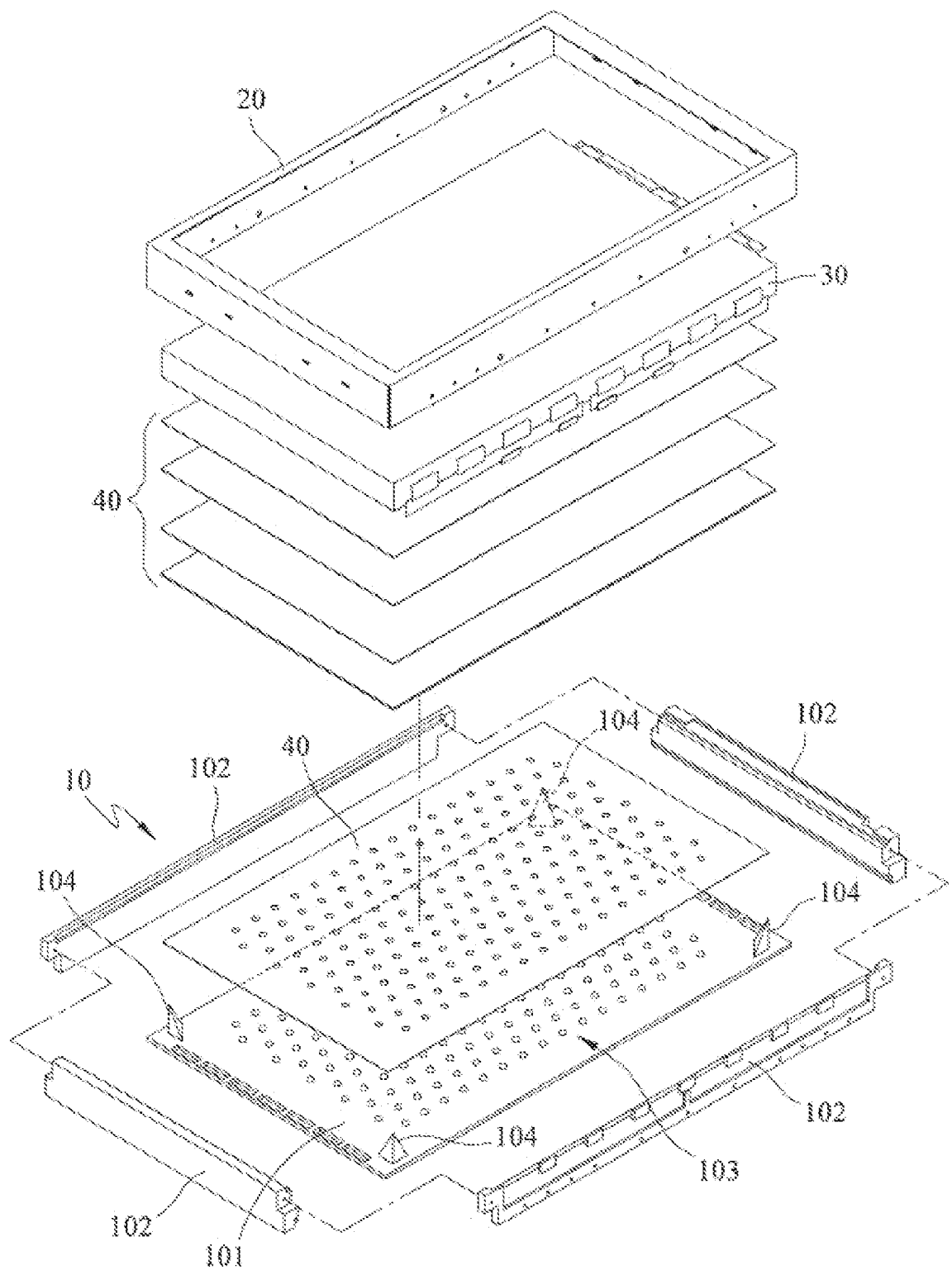
FIG. 2 is a perspective view showing an LCD according to the present invention.

FIG. 2 is a perspective view of the LCD according to the present invention. The LCD comprises an LCD panel 30, a front bezel 20 disposed above the LCD panel 30, and a backlight module 10 that has at least one light source. Preferably, at least one light source should be an LED array 103 disposed on the back bezel 101. A frame 102 is disposed along the two adjacent edge portions of the back bezel 101. The frame 102 and the back bezel 101 form at least one corner portion. There are a plurality of optical films 40 disposed between the LCD panel 30 and the backlight module 10 for enhancing the efficiency of light usage and luminance promotion. The optical films 40 can be diffusing films, prism films, acrylic films and/or light enhancing films.

There are reflectors 104 disposed on the corner portions of the back bezel 101. The reflectors 104 are provided for reducing dark areas occurring on the corners or edges of the backlight module and for increasing the uniformity of the luminance. The reflectors 104 can be disposed on the areas adjacent to the edges of the back bezel 101 as well.

The LCD panel 30 comprises an upper glass substrate, a lower glass substrate, and a liquid crystal layer (not shown) disposed therebetween. The upper glass substrate and the lower glass substrate can be a color filter substrate and an active (or passive) array substrate, respectively. The voltage difference between the upper and the lower glass substrates make the liquid crystal in the liquid crystal layer rotate or tilt accordingly. Therefore, the light transmitted through the LCD panel 30 will be controlled and will then produce images on the LCD panel 30.

The LED array 103 can be constituted by individually packaging a plurality of single LEDs or by integrally packaging the same in advance into a module that has a plurality of LEDs. A printed circuit board (not shown) is electrically connected to the LED array 103 to provide electrical power. The LEDs of the LED array 103 can be red, green, blue, white or other colors, depending on what the LCD panel 30 requires.

The material of the frame 102 and the back bezel 101 could be reflective materials. The internal walls thereof can be made of reflective materials or have reflective films stuck to the walls to reflect the light emitted from the LED array 103.

Figure 3:
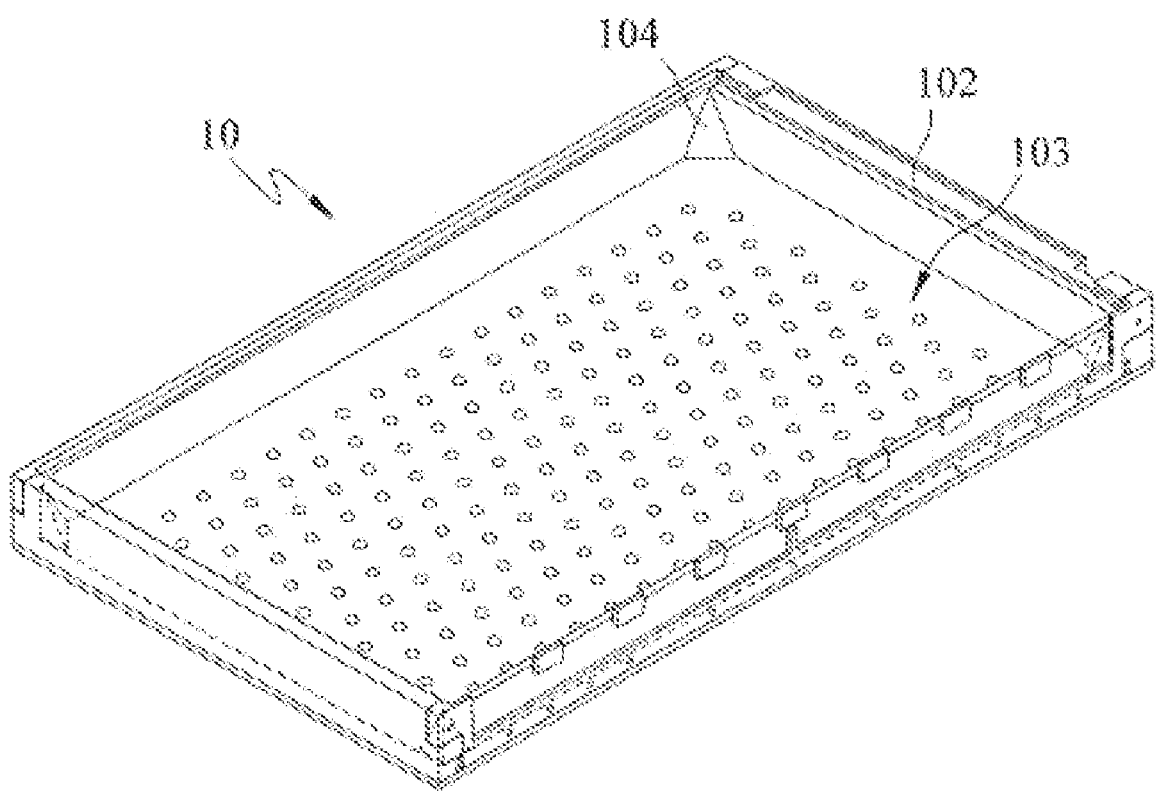
FIG. 3 is a perspective view showing an LED backlight module according to the present invention.

FIG. 3 is a perspective view of an LED backlight module 10 according to the preferred embodiment of the present invention. As shown in FIG. 3, there is a frame 102 (including four assembled elements or only a single element) disposed along four edge portions of the back bezel 101 of the backlight module 101. Four reflectors 104 are disposed on the four corner potions formed by the frames 102 and the back bezel 101. The contact area between the reflectors 104 and the back bezel 101 is about, but not limited to, 2% to 10%, preferably, about 4% to 8%, of the planar area of the back bezel 101.

The reflector 104 can be made of silver or polyethylene terephthalate (PET) resin, or similar materials comprising the same. The reflector 104 and the back bezel 101 can be formed integrally into one piece, then assembled with the frame 102. Alternatively, the reflector 104, the back bezel 101 and the frame 102 can be formed integrally into one piece to constitute the desired structure. It is understandable that the method employed for manufacturing the reflector 104 can be through a computer numerical control (CNC) process or a press process if the reflectors 104 are made of metal. The well-known CNC process includes inputting orders or numerical values to the computer. According to the input orders or numerical values, devices connected to the computer, for example, operate when creating, chamfering, drilling, pressing and/or sticking additional elements onto the workpiece or elements. Advantages thereof include saved time, precision, low cost and no need for molds. Alternatively, the reflector 104 can be formed on the backlight module by adding it onto the corner portion. The reflector 104 can be made according to the above-mentioned CNC process. The reflectors 104 and the back bezel 101 can be formed integrally. The reflectors 104 and the frame 102 can be formed integrally too.

As shown in FIG. 4A to FIG. 4D, the reflector 104, for example, can be pyramid-shaped, which comprises a body that has a reflective surface formed thereon. The reflective surface reflects lights with its original material property, or by a reflective film additionally disposed on it. An alternative way to reflect light is to apply or coat at least one layer of reflective material, for example, silver, barium sulfate, polyethylene terephthalate (PET) resin or the combination thereof, onto the reflective surface of the reflector 104.

Figure 4A:
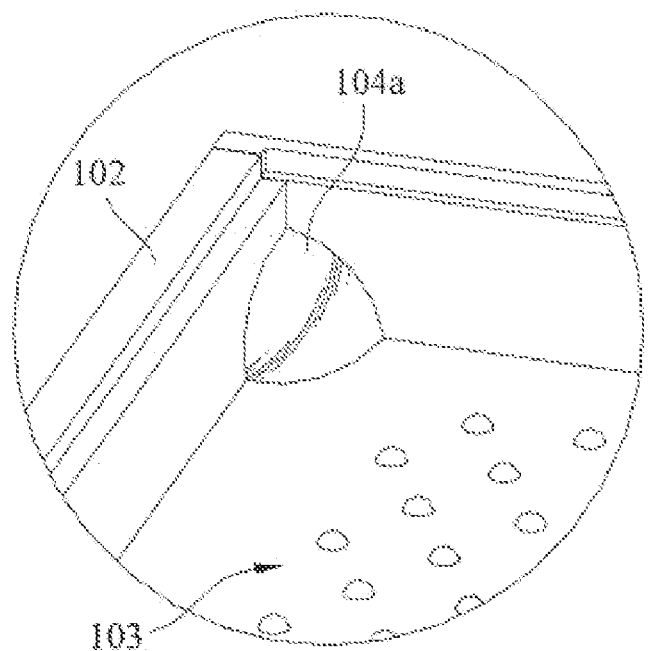
FIG. 4A to FIG. 4D are reflectors of different configurations according to the present invention.
Figure 4B:
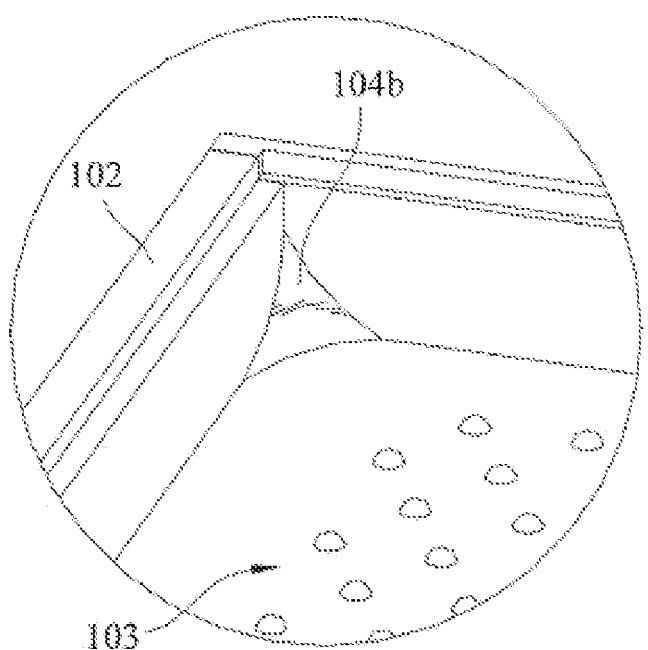
Figure 4C:
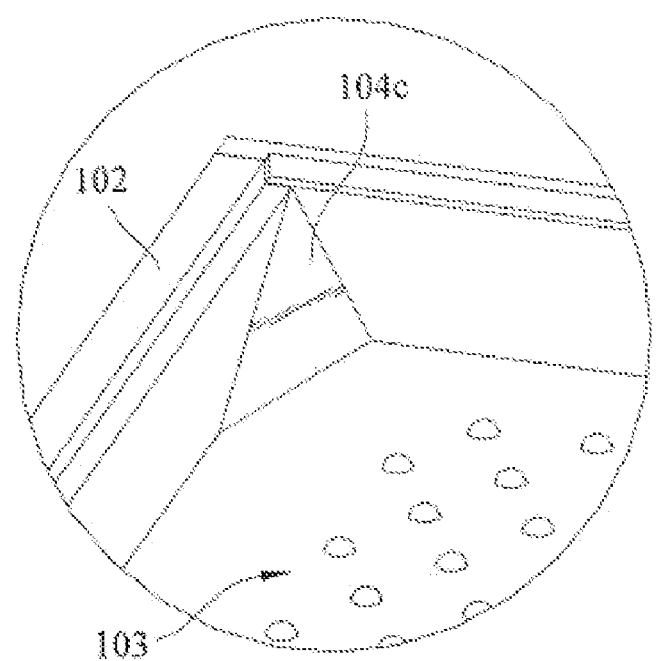
Figure 4D:
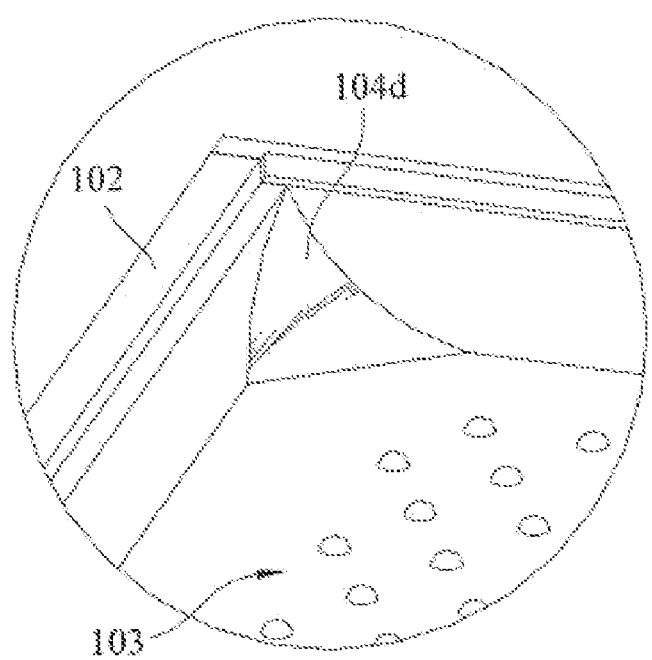

As shown in FIG. 4A, a curved surface of the reflector 104a projects convexly out of the corner portion. In FIG. 4B, a curved surface of the reflector 104b projects concavely into the corner portion. In FIG. 4C, a reflective surface of the reflector 104c is a flat plane. In FIG. 4D, a curved surface of the reflector 104d is a regularly or an irregularly curved face. It is understandable that the shape or structure of the reflective surface of the reflector 104 is not limited, provided that its configuration provides the basic functions to better reflect lights to eliminate the dark areas occurring at the edge and corner portions.

Figure 5A:
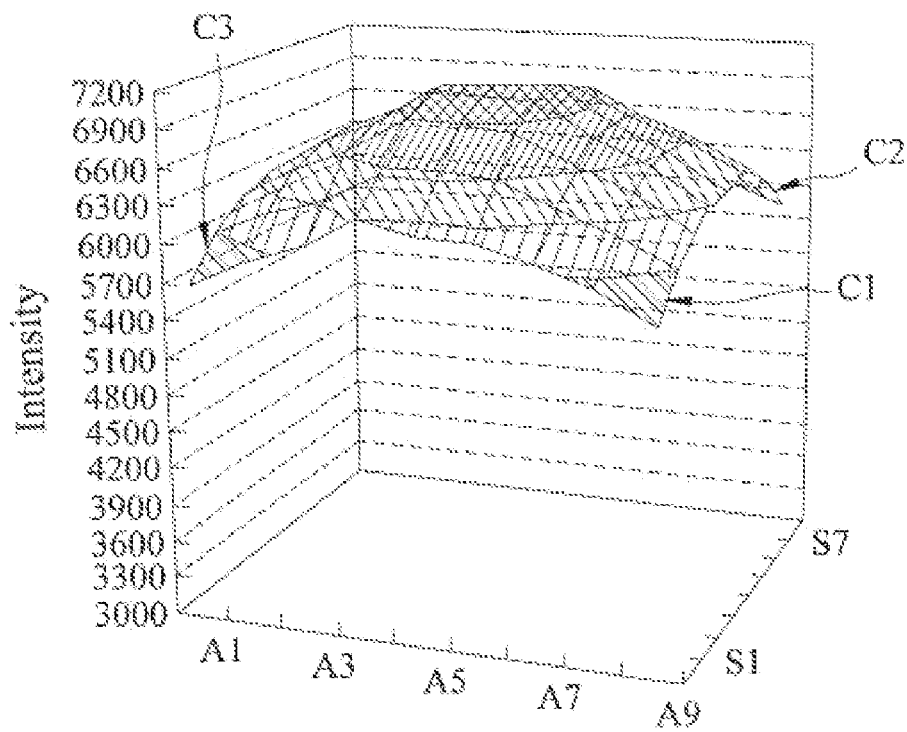
FIG. 5A is an experimental diagram showing the light intensity (in nit), in view of each area measured from the conventional backlight module.
Figure 5B:
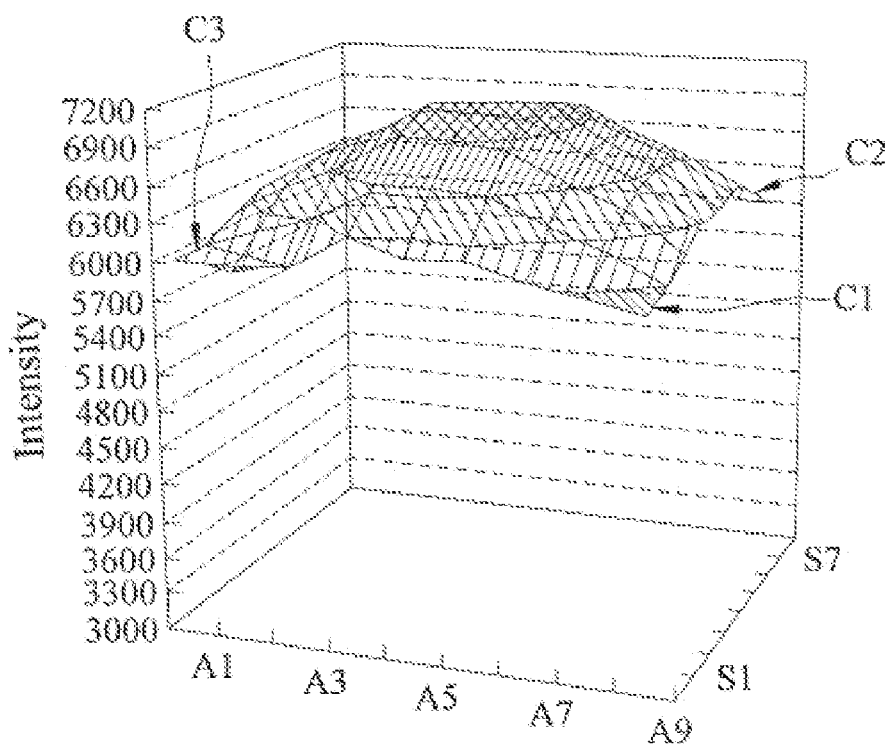
FIG. 5B is an experimental diagram showing the light intensity (in nit), in view of each area measured from the backlight module according to the present invention.

FIG. 5A is an experimental diagram showing the light intensity (in nit) which is measured by each unit area at the light output from a backlight module of the existing art. FIG. 5B is a diagram according to the present invention that corresponds to FIG. 5A. With reference to these two diagrams, it can be observed that the light intensity of corner portions C1, C2 and C3 of the backlight module is generally lower than that of the central area; therefore, the luminance of the light output is not uniform. For example, it can be found in FIG. 5A that the lowest light intensity (nit) is about 5722 nit, which is about 81% of the highest one, 7069 nit. Turning to FIG. 5B, the lowest light intensity (nit) is about 5929 nit, which is about 85% of the highest one, 7016 nit. In conclusion, the decrease in the highest light intensity (nit) is merely about 0.75% which makes no substantial influence on the image quality. On the other hand, the increase in the uniformity of the luminance is 4%, which apparently improves the output quality of the image. The backlight module according to the present invention can increase the efficiency of light usage and luminance promotion, and ultimately, increase the uniformity of the luminance provided by the backlight module.

The above disclosure relates to the detailed technical contents and inventive features thereof. People skilled in this field may proceed with a variety of modifications and replacements based on the disclosures and suggestions of the invention as described without departing from the characteristics thereof. Although such modifications and replacements are not fully disclosed in the above descriptions, they have substantially been covered in the following claims as appended.

What is claimed is:

1. A backlight module comprising:
   a bezel having at least two adjacent edge portions;
   a frame disposed on the bezel along the at least two adjacent edge portions, wherein the frame and the bezel form at least one corner portion;
   at least one light source disposed on the bezel; and
   at least one reflector disposed on the at least one corner portion.

2. The backlight module according to claim 1, wherein the at least one reflector comprises material selected from the group consisting of silver, barium sulfate, polyethylene terephthalate resin (PET resin), and combinations thereof.

3. The backlight module according to claim 1, wherein the at least one reflector is pyramid-shaped.

4. The backlight module according to claim 1, wherein the at least one reflector comprises:
   a body having a reflective surface; and
   a reflective film disposed onto the reflective surface.

5. The backlight module according to claim 1, wherein the at least one reflector includes at least one reflective surface having at least one reflective element coated thereon.

6. The backlight module according to claim 5, wherein the at least one reflective element is comprised of silver.

7. The backlight module according to claim 1, wherein the at least one reflector has at least one curved surface projecting convexly out of the at least one corner portion.

8. The backlight module according to claim 1, wherein the at least one reflector has at least one curved surface projecting concavely into the at least one corner portion.

9. The backlight module according to claim 1, wherein the at least one reflector has at least one reflective surface.

10. The backlight module according to claim 1, wherein the at least one reflector has an irregularly curved reflective surface.

11. The backlight module according to claim 1, wherein the at least one reflector and the bezel are formed integrally.

12. The backlight module according to claim 1, wherein the at least one reflector, the bezel and the frame are formed integrally.

13. The backlight module according to claim 1, wherein the at least one light source comprises at least one light emitting diode.

14. The backlight module according to claim 1, wherein the at least one light source comprises at least one light emitting diode array.

15. The backlight module according to claim 1, wherein the frame includes at least one internal wall having a reflective element disposed thereon.

16. The backlight module according to claim 1, wherein the frame includes:
   at least one internal wall, and
   a reflective film disposed onto the at least one internal wall.

17. The backlight module according to claim 1, wherein the at least one reflector and the bezel define a contact area which ranges from about 2% to about 10% of a planar area of the bezel.

18. The backlight module according to claim 1, wherein the at least one reflector and the bezel define a contact area which ranges from about 4% to about 8% of a planar area of the bezel.

19. The liquid crystal display comprising the backlight module according to claim 1.

20. A backlight module comprising:
   a rectangular bezel having four adjacent edge portions;
   a frame, disposed on the bezel along the four edge portions, wherein the frame and the bezel form four corner portions;
   at least one light source disposed on the bezel; and
   at least one reflector disposed on at least one of the four corner portions.

* * * * *